US 11,856,400 B2

(12) United States Patent
Miyake et al.

(10) Patent No.: US 11,856,400 B2
(45) Date of Patent: Dec. 26, 2023

(54) UNAUTHORIZED-COMMUNICATION COPING SYSTEM AND UNAUTHORIZED-COMMUNICATION COPING METHOD

(71) Applicant: Hitachi, Ltd., Tokyo (JP)

(72) Inventors: Kantaro Miyake, Tokyo (JP);
Masayuki Takase, Tokyo (JP); Takaaki Suzuki, Tokyo (JP); Joe Ogasawara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 105 days.

(21) Appl. No.: 17/592,735

(22) Filed: Feb. 4, 2022

(65) Prior Publication Data
US 2022/0295278 A1 Sep. 15, 2022

(30) Foreign Application Priority Data
Mar. 11, 2021 (JP) .................. 2021-038932

(51) Int. Cl.
*G06F 7/04* (2006.01)
*G06F 15/16* (2006.01)
*H04L 29/06* (2006.01)
*H04W 12/08* (2021.01)
*H04W 12/69* (2021.01)

(52) U.S. Cl.
CPC .......... *H04W 12/08* (2013.01); *H04W 12/69* (2021.01)

(58) Field of Classification Search
CPC .. H04W 12/08; H04W 12/69; H04L 63/0281; H04L 63/1408
USPC .......................................................... 726/4
See application file for complete search history.

(56) References Cited

U.S. PATENT DOCUMENTS

| 2006/0248220 A1* | 11/2006 | Funabiki ............... | H04W 40/22 709/238 |
| 2017/0237733 A1* | 8/2017 | Osaki .................... | H04L 51/216 726/4 |

FOREIGN PATENT DOCUMENTS

JP 2019-114950 A 7/2019

* cited by examiner

*Primary Examiner* — Jeffrey C Pwu
*Assistant Examiner* — Samuel Ambaye
(74) *Attorney, Agent, or Firm* — Crowell & Moring LLP

(57) ABSTRACT

A routing device and an unauthorized communication coping device are provided. The routing device is a device that performs routing of a packet in conformance with a wireless communication protocol in a wireless communication section which is a communication section that connects a base station and a core network device, and the routing device performs network tapping on a packet as a routing target and transmits the network-tapped packet to the unauthorized communication detection device (the device that performs unauthorized communication determination which is determination of whether or not communication is unauthorized communication based on a packet). The unauthorized communication coping device performs, for unauthorized communication which is communication for which a result of the unauthorized communication determination based on the network-tapped packet is true, unauthorized communication coping including configuring communication control information which is information for controlling the unauthorized communication for at least one of the routing device and the core network device.

10 Claims, 20 Drawing Sheets

FIG. 7

MANAGEMENT SCREEN — 700

710

| INCIDENT NOTIFICATION DATE AND TIME | INCIDENT CONTENT | COPING IS AUTOMATICALLY PERFORMED |
|---|---|---|
| 2020/202/20 13:00:00 | UNAUTHORIZED IP FLOW FROM ICCID "ICCID01" IS DETECTED | ACT001 |
| 2020/202/20 13:00:00 | COMMUNICATION HAVING LARGER AMOUNT THAN USUAL IS DETECTED IN COMMUNICATION FOR ICCID "ICCID02" | ACT002 |

FILTERING RULE TABLE
201

| BASE STATION IP ADDRESS 801 | MBH QCI 802 | TRANSMISSION SOURCE IP ADDRESS 803 | TRANSMISSION SOURCE PORT NUMBER 804 | DESTINATION IP ADDRESS 805 | DESTINATION PORT NUMBER 806 | PROTOCOL 807 | ROUTING ACTION ID 808 |
|---|---|---|---|---|---|---|---|
| 123.0.1.1 | 7 | 10.0.1.1 | 80 | 10.0.10.1 | Any | UDP | RA000 |
| 1230.2.1 | 9 | 10.0.1.2 | 23 | 10.0.10.2 | 23 | Any | RA999, RA001 |
| 123.0.1.1 | Any | 10.0.1.3 | 80 | 10.0.10.3 | 80 | Any | RA000, RA001 |
| ... | | | | | | | |

FIG. 9

ROUTING ACTION TABLE
202

| ROUTING ACTION ID | ACTION | TRANSMISSION DESTINATION IF |
|---|---|---|
| RA000 | PASS | LAN IF |
| RA999 | BLOCK | - |
| RA001 | NETWORK TAP | MEC IF |
| ... | ... | ... |

UNAUTHORIZED COMMUNICATION DETERMINATION TABLE
301A

| 1001 TRANSMISSION SOURCE IP ADDRESS | 1002 DESTINATION IP ADDRESS | 1003 AMOUNT OF COMMUNICATION [bits] | 1004 NUMBER OF PACKETS | 1005 PACKET SIZE | 1006 NON-COMMUNICATION TIME [seconds] |
|---|---|---|---|---|---|
| 10.0.1.1 | 10.0.10.1 | 10000 | 200 | 500 | 2 |
| 10.0.1.2 | 10.0.10.2 | 130000 | 100 | 1300 | 5 |
| 10.0.1.3 | 10.0.10.3 | 5000 | 5 | 1000 | 5 |
| ... | ... | ... | ... | ... | ... |

FIG. 11

IP-SIM TABLE
401

| IP ADDRESS | ICCID |
|---|---|
| other | SERVER |
| 10.0.1.1 | ICCID001 |
| 10.0.1.2 | ICCID002 |
| 10.0.1.3 | ICCID003 |
| … | … |

1101 — IP ADDRESS
1102 — ICCID

FIG. 12

SIM-COPING TABLE
402A

| TRANSMISSION SOURCE ICCID | DESTINATION ICCID | COPING ID |
|---|---|---|
| SERVER | ICCID001 | ACT002 |
| ICCID002 | SERVER | ACT001 |
| ICCID003 | ICCID003 | ACT003 |
| … | … | … |

1201 — TRANSMISSION SOURCE ICCID
1202 — DESTINATION ICCID
1203 — COPING ID

FIG. 13

COPING CONTENT TABLE
403

| COPING ID | APPLICATION TYPE | COPING CONTENT |
|---|---|---|
| ACT001 | MISSION CRITICAL A | IMMEDIATELY, INCIDENT NOTIFICATION IS IMPLEMENTED ON MANAGEMENT SCREEN |
| ACT002 | MISSION CRITICAL B | FOR n SECONDS, WHEN ALERT INFORMATION IS CONTINUED, INCIDENT NOTIFICATION IS IMPLEMENTED ON MANAGEMENT SCREEN |
| ACT003 | MISSION CRITICAL A | IMMEDIATELY, TRANSMISSION SOURCE SIM AND DESTINATION SIM ARE DISABLED OR IP FLOW IS BLOCKED |
| ACT004 | MISSION CRITICAL B | FOR n SECONDS, WHEN INCIDENT STATE IS CONTINUED, TRANSMISSION SOURCE SIM AND DESTINATION SIM ARE DISABLED OR IP FLOW IS BLOCKED |
| ACT005 | NON-MISSION CRITICAL A | IMMEDIATELY, TRANSMISSION SOURCE SIM IS DISABLED OR IP FLOW IS BLOCKED, AND INCIDENT NOTIFICATION IS IMPLEMENTED ON MANAGEMENT SCREEN |
| ACT006 | NON-MISSION CRITICAL B | IMMEDIATELY, TRANSMISSION SOURCE SIM IS DISABLED OR IP FLOW IS BLOCKED, AND INCIDENT NOTIFICATION IS IMPLEMENTED ON MANAGEMENT SCREEN |
| ACT007 | NON-MISSION CRITICAL A | FOR n SECONDS, WHEN ALERT IS CONTINUED, TRANSMISSION SOURCE SIM IS DISABLED OR IP FLOW IS BLOCKED, AND INCIDENT NOTIFICATION IS IMPLEMENTED ON MANAGEMENT SCREEN |
| ... | ... | ... |

FIG. 14

SIM STATE TABLE
501

| ICCID (1401) | STATE (1402) |
|---|---|
| ICCID001 | ENABLED |
| ICCID002 | DISABLED |
| ... | ... |

FIG. 15

UPLINK PROCESSING TABLE
605U

| ICCID (1501) | M-ID (1502) | APN (1503) |
|---|---|---|
| ICCID001 |  | 1 |
| ... | ... | ... |

FIG. 16

DOWNLINK PROCESSING TABLE
605D

| ICCID (1601) | M-ID (1602) | APN (1603) |
|---|---|---|
| ICCID001 |  | 1 |
| ... | ... | ... |

FIG. 20

UNAUTHORIZED COMMUNICATION DETERMINATION TABLE
301B

| TRANSMISSION SOURCE IP ADDRESS | TRANSMISSION SOURCE PORT NUMBER | DESTINATION IP ADDRESS | DESTINATION PORT NUMBER | PROTOCOL | AMOUNT OF COMMUNICATION [bits] | NUMBER OF PACKETS | PACKET SIZE | NON-COMMUNICATION TIME [seconds] |
|---|---|---|---|---|---|---|---|---|
| 10.0.1.1 | 80 | 10.0.10.1 | 80 | 3 | 10000 | 200 | 500 | 2 |
| 10.0.1.2 | 23 | 10.0.10.2 | 23 | 3 | 130000 | 100 | 1300 | 5 |
| 10.0.1.3 | 80 | 10.0.10.3 | 80 | 17 | 5000 | 5 | 1000 | 5 |
| 10.0.2.4 | 23 | 10.0.10.4 | 23 | 17 | 8000000 | 10000 | 800 | 0.5 |

FIG. 21

SIM-COPING TABLE
402B

| TRANSMISSION SOURCE SIM ICCID 1201 | TRANSMISSION SOURCE PORT NUMBER 2311 | DESTINATION SIM ICCID 1202 | DESTINATION PORT NUMBER 2312 | PROTOCOL 2313 | COPING RULE ID 1203 |
|---|---|---|---|---|---|
| SERVER | 80 | ICCID001 | 80 | 3 | ACT002 |
| ICCID002 | 23 | SERVER | 23 | 3 | ACT001 |
| ICCID001 | 80 | ICCID003 | 80 | 17 | ACT003 |
| ICCID004 | 23 | ICCID001 | 23 | 17 | ACT004 |

UNAUTHORIZED-COMMUNICATION COPING SYSTEM AND UNAUTHORIZED-COMMUNICATION COPING METHOD

INCORPORATION BY REFERENCE

This application claims priority based on Japanese patent application, No. 2021-038932 filed on Mar. 11, 2021, the entire contents of which are incorporated herein by reference.

BACKGROUND

The present invention generally relates to coping with unauthorized communication.

As one of wireless communications defined by the Third Generation Partnership Project (3GPP), there is Long-Term Evolution (LTE) communication. JP 2019-114950 A discloses a defense device that detects an abnormality in a communication line through which data is transmitted from a core network device and reduces a communicable capacity of the communication line in which the abnormality is detected.

SUMMARY

According to JP 2019-114950 A, the defense device is disposed on a server side of the core network device. Thus, The defense device on a server-side could not detect unauthorized communication in a wireless communication section that connects the core network device and a base station. Thus, the defense device could not cope with the unauthorized communication in wireless communication section.

A defense device in the wireless communication section enable to detect and cope with the unauthorized communication in the wireless communication section. However, the defense device constantly checks the communication in the wireless communication section and may cause delay of wireless communications in the section.

This kind of problem may also occur in wireless communication other than LTE communication (for example, 5th Generation (5G) communication).

In response to the above issue, it is an object of the present invention to provide An unauthorized communication coping system that cope with unauthorized communication detected by an unauthorized communication detection device that performs unauthorized communication determination which is determination of whether or not communication is unauthorized communication based on a packet is constructed. The system includes a routing device and an unauthorized communication coping device. The routing device is a device that performs routing of a packet in conformance with a wireless communication protocol in a wireless communication section which is a communication section that connects a base station and a core network device, and the routing device performs network tapping on a packet as a routing target and transmits the network-tapped packet to the unauthorized communication detection device. The unauthorized communication coping device performs, for unauthorized communication which is communication for which a result of the unauthorized communication determination based on the network-tapped packet is true, unauthorized communication coping including configuring communication control information which is information for controlling the unauthorized communication for at least one of the routing device and the core network device.

According to the present invention, it is possible to cope with the unauthorized communication in the wireless communication section without delay of wireless communication.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 7 illustrates an example of a management screen;

FIG. 8 illustrates a configuration example of a filtering rule table;

FIG. 9 illustrates a configuration example of a routing action table;

FIG. 10 illustrates a first configuration example of an unauthorized communication determination table;

FIG. 11 illustrates a configuration example of an IP-SIM table;

FIG. 12 illustrates a first configuration example of a SIM-coping table;

FIG. 13 illustrates a configuration example of a coping content table;

FIG. 14 illustrates a configuration example of a SIM state table;

FIG. 15 illustrates a configuration example of an uplink processing table;

FIG. 16 illustrates a configuration example of a downlink processing table;

FIG. 17 illustrates an example of a flow of a first case where unauthorized communication is detected and coped with;

FIG. 20 illustrates a second configuration example of the unauthorized communication determination table;

FIG. 21 illustrates a second configuration example of the SIM-coping table;

FIG. 22 illustrates an example of a flow of a second case where unauthorized communication is detected and coped with.

DESCRIPTION OF THE EMBODIMENTS

Figure 1:
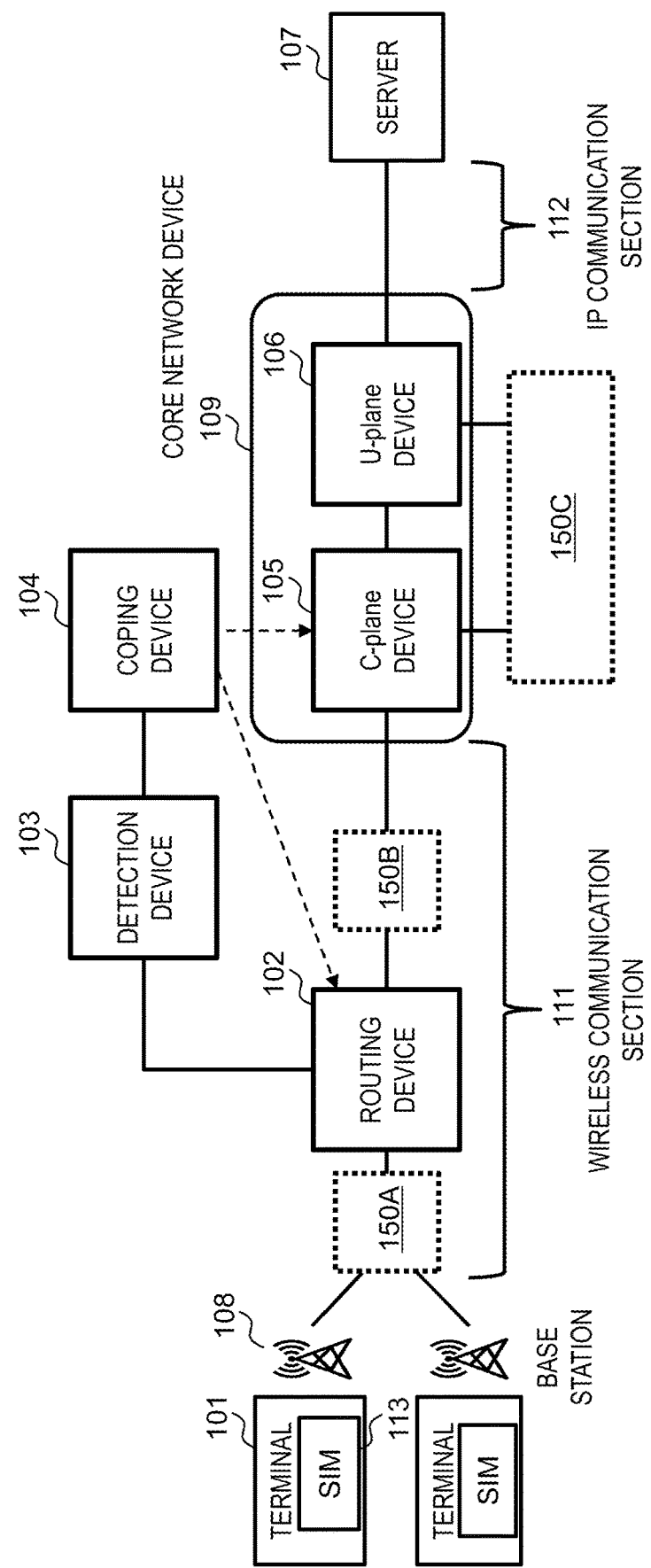
FIG. 1 illustrates a configuration example of the entire system according to an embodiment.

In the following description, an "interface device" may be one or more interface devices. The one or more interface devices may be at least one of the following interface devices.

One or more input and output (I/O) interface devices. The input and output (I/O) interface device is an interface device for at least one of an I/O device and a remote computer for display. The I/O interface device for the computer for display may be a communication interface device. The at least one I/O device may be either a user interface device, for example, an input device such as a keyboard and a pointing device, or an output device such as a display device.

One or more communication interface devices. The one or more communication interface devices may be one or more communication interface devices of the same type (for example, one or more network interface cards (NIC)), or may be two or more communication interface devices of different types (for example, an NIC and a host bus adapter (HBA)).

Further, in the following description, a "memory" is one or more memory devices which are an example of one or more storage devices, and may be typically a main storage device. At least one memory device of the memory may be a volatile memory device, or may be a non-volatile memory device.

Further, in the following description, a "persistent storage device" may be one or more persistent storage devices which are an example of one or more storage devices. The persistent storage device is typically a nonvolatile storage device (for example, auxiliary storage device), specifically, for example, a hard disk drive (HDD), a solid state drive (SSD), a Non-Volatile Memory Express (NVME) drive, or a storage class memory (SCM).

Further, in the following description, the "storage device" may be at least the one of the memory and the persistent storage device.

Further, in the following description, a "processor" may be one or more processor devices. At least one processor device is typically a microprocessor device such as a central processing unit (CPU). Another type of processor device such as a graphics processing unit (GPU) may be used. At least one processor device may be a single-core processor device, or may be a multi-core processor device. At least one processor device may be a processor core processor device. At least one processor device may be a processor device in a broad sense such as a circuit (for example, a field-programmable gate array (FPGA), a complex programmable logic device (CPLD), or an application specific integrated circuit (ASIC)) that is an aggregate of gate arrays by a hardware description language that performs part or all of processing.

Further, in the following description, although information that can be output for input may be described by an expression such as an "xxx table", the information may be data of any structure (for example, may be structured data or unstructured data), may be a neural network that generates an output for an input, or may be a learning model represented by a genetic algorithm or a random forest. Accordingly, the "xxx table" can be referred to as "xxx information". Further, in the following description, a configuration of each table is an example, so one table may be divided into two or more tables, or all or a part of the two or more tables may be combined into one table.

In the following description, although functions may be described in terms of "yyy units", the functions may be realized by one or more computer programs being executed by the processor, may be realized by one or more hardware circuits (for example, FPGA or ASIC), or may be realized by a combination thereof. When the function is realized by the program being executed by the processor, since predetermined processing is performed while appropriately using the storage device and/or the interface device, the function may be at least a part of the processor. The process described with the function as a subject may be process performed by the processor or a device including the processor. The program may be installed from a program source. The program source may be, for example, a program distribution computer that is connected via a network and includes a non-transitory storage device or a computer-readable recording medium (for example, a non-transitory recording medium). The description of each function is an example, and a plurality of functions may be combined into one function, or one function may be divided into a plurality of functions.

Further, in the following description, a common reference sign of reference signs will be used when the same kind of elements are described without distinguishing these elements, and reference signs may be used when the same kind of elements are distinguished.

Hereinafter, some embodiments will be described. Note that, in the following description, the following coping is adopted.

5G is used as an example of a communication service that requires U-plane and C-plane. However, the present invention is also applicable to communications other than 5G, such as LTE.

A "terminal" is an example of user equipment (UE), and is an information processing terminal of a user (typically a mobile terminal). The terminal may be an information processing terminal owned or rented by the user or a related person thereof. The related person of the user may be, for example, an employee or a customer of the user.

A "server" is an example of a communication partner of the terminal. The terminal may be an example of a communication partner of another terminal.

The "U-plane" is a user plane, and specifically, is a group of functions (one or more functions) for transferring user data. In the following embodiments, the U-plane is realized as a device (for example, one or more devices), but may also be a group of functions in the device. The U-plane realized as the device may be called a "U-plane device".

The "C-plane" is a control plane, and specifically, is a group of functions (one or more functions) that performs at least one of authentication of the terminal and control related to session management. The control performed by the C-plane includes, for example, control related to authentication for connecting the terminal and control related to handover accompanying the movement of the terminal. In the following embodiments, the C-plane is realized as the device (for example, one or more devices), but may also be a group of functions in the device. The C-plane realized as the device may be called a "C-plane device".

FIG. 1 illustrates a configuration example of the entire system according to the embodiment.

In communication between a terminal 101 and a server 107, a packet passes through a base station (a base station includes an antenna for transmitting and receiving radio waves) 108, a routing device 102, and a core network device 109. The core network device 109 includes at least one of a C-plane device 105 and a U-plane device 106 (for example, at least the C-plane device 105).

A communication section that connects the base station 108 and the core network device 109 is a wireless communication section 111 (typically mobile back haul (MBH)). In the wireless communication section 111, wireless communication conforming to a wireless communication protocol is performed. Specifically, for example, the terminal 101 has a subscriber identity module (SIM) card 113, and performs wireless communication using an integrated circuit card ID (ICCID) stored in the SIM card 113. The SIM card 113 may be an extended SIM card (for example, a user identity module (UIM) card). The ICCID may be an example of a device ID used for wireless communication. In place of or in addition to the ICCID, another type of device ID (for example, international mobile subscriber identity (IMSI)) may be adopted. The "device ID" mentioned herein may be an ID for identifying the device itself or a communication device (for example, an IC card such as the SIM card 113) of the device for each of a transmission source and a destination.

The communication section that connects the core network device 109 and the server 107 is an Internet Protocol (IP) communication section 112. The IP communication section 112 is a communication section in which communication according to an IP is performed. The core network device 109 is, for example, an Evolved Packet Core (EPC) device.

In the communication between the terminal 101 and the server 107, the packet passes through the wireless communication section 111, the core network device 109, and the IP communication section 112. In the communication between the terminal 101 and the terminal 101, the packet passes through the wireless communication section 111, the core network device 109, and the wireless communication section 111. In these communication paths, packets may pass through switch groups 150 (including one or more switch devices) as appropriate. For example, communication between the base station 108 and the routing device 102 may be performed via a switch group 150A, communication between the routing device 102 and the core network device 109 may be performed via a switch group 150B, or communication between the C-plane device 105 and the U-plane device 106 may be performed via a switch group 150C. The switch groups 150A to 150C may be one switch group.

The unauthorized communication coping system according to the present embodiment performs unauthorized communication coping which is coping with unauthorized communication detected by an unauthorized communication detection device (hereinafter, detection device) 103, which determines whether or not the communication is unauthorized communication based on the packet. The system includes the routing device 102 and an unauthorized communication coping device (hereinafter, coping device) 104.

The routing device 102 is a device that performs packet routing (in other words, traffic routing) in conformance with a wireless communication protocol in the wireless communication section 111, and is, for example, a multi-access edge computing (MEC) device. The routing device 102 performs network tapping on the packet as a routing target, and transmits the network-tapped packet to the detection device 103.

The coping device 104 performs unauthorized communication coping for unauthorized communication which is communication for which a result of the unauthorized communication determination based on the network-tapped packet is true (that is, the unauthorized communication detected by the detection device 103). The unauthorized communication coping includes configuring communication control information which is information for controlling the unauthorized communication for at least one of the routing device 102 and the core network device 109 (specifically, for example, the C-plane device 105) as indicated by a broken line arrow.

The detection device 103 and the coping device 104 are present in a path branched from the wireless communication section 111 through which packets transmitted and received by the terminal 101 pass. The routing device 102 in the wireless communication section 111 performs network tapping, and thus, the network-tapped packet is transmitted to the path branched from the wireless communication section 111, and the unauthorized communication is detected and coped with. Thus, it is possible to cope with the unauthorized communication in the wireless communication section 111 without delay in the wireless communication in the wireless communication section 111.

Further, the packet that is network-tapped and transmitted to the detection device 103 may be a duplicate of the packet as the routing target itself (packet conforming to the wireless communication protocol), but is an IP packet having an IP header including information indicating an IP address of each of the transmission source and the destination in the present embodiment. Specifically, for example, in the present embodiment, the "network tapping" is to extract an IP packet by decapsulating the packet as the routing target conforming to the wireless communication protocol and duplicate the extracted IP packet, or to extract an IP packet from the duplicated packet by decapsulating after the extracted packet as the routing target is duplicated. An intrusion detection system (IDS) is an example of the detection device 103, but IDS generally detects unauthorized communication based on an IP packet, and cannot analyze the packet conforming to the wireless communication protocol. In the present embodiment, the packet that is network-tapped and transmitted to the detection device 103 by the routing device 102 is the IP packet. Thus, it is expected that the unauthorized communication in the wireless communication section 111 can be detected by the general IDS.

Hereinafter, each of the devices 102 to 106 illustrated in FIG. 1 will be described in detail.

Figure 2:
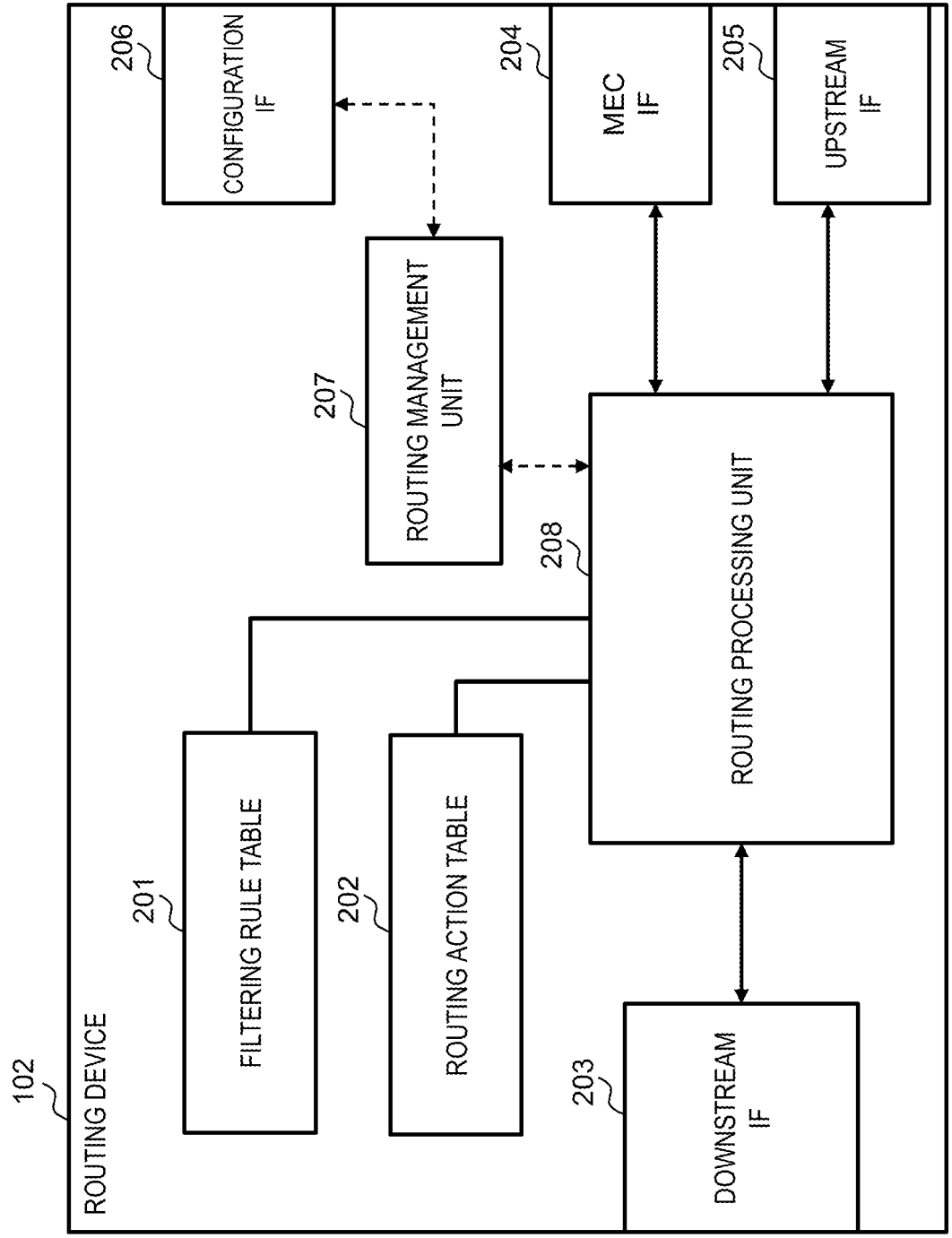
FIG. 2 illustrates a configuration example of a routing device.

FIG. 2 illustrates a configuration example of the routing device 102.

The routing device 102 may include an interface device, a storage device, and a processor connected to these devices. Examples of the interface device include a downstream IF 203, a MEC IF 204, an upstream IF 205, and a configuration IF 206. Examples of information stored in the storage device include a filtering rule table 201 and a routing action table 202. Examples of a program stored in the storage device and executed by the processor include a program for realizing functions such as a routing management unit 207 and a routing processing unit 208. At least a part of the routing management unit 207 and the routing processing unit 208 may be realized by a hardware circuit.

All the IFs 203 to 206 may be one or plural. All the IFs 203 to 206 are, for example, ports. The downstream IF 203 is an IF connected to the base station 108. The upstream IF 205 is an IF connected to the core network device 109. The communication between the terminal 101 and the server 107 is performed via the IFs 203 and 205. The MEC IF 204 is an IF to which the network-tapped IP packet is output, and is an IF connected to the detection device 103. The configuration IF 206 is an IF that receives information configured in at least one of the tables 201 and 202.

The filtering rule table 201 is a table representing filtering rules performed by the routing processing unit 208. The routing action table 202 is a table in which routing actions performed by the routing processing unit 208 are defined.

The routing management unit 207 manages the routing device 102. For example, the routing management unit 207 configures configuration information (information configured in at least one of the tables 201 and 202) received by the configuration IF 206 in at least one of the tables 201 and 202. The configuration may be performed via or not via the routing processing unit 208.

The routing processing unit 208 filters the packet based on the filtering rule table 201, and performs routing of the packet based on the routing action table 202.

Figure 3:
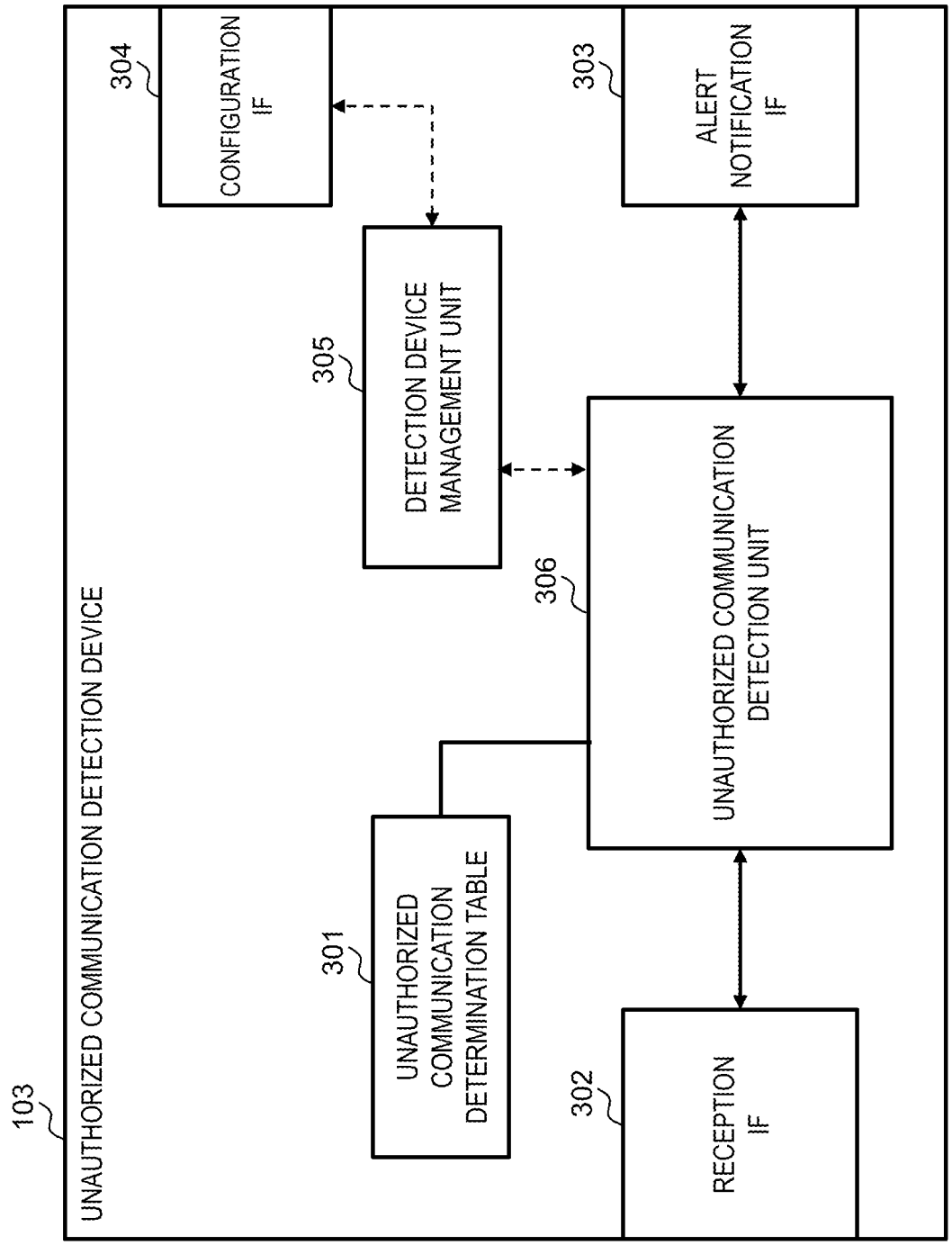
FIG. 3 illustrates a configuration example of an unauthorized communication detection device.

FIG. 3 illustrates a configuration example of the detection device 103.

The detection device 103 may include an interface device, a storage device, and a processor connected to these devices. Examples of the interface device include a reception IF 302, an alert notification IF 303, and a configuration IF 304. Examples of information stored in the storage device include an unauthorized communication determination table 301. Examples of a program stored in the storage device and executed by the processor include a program for realizing functions such as a detection device management unit 305 and an unauthorized communication detection unit 306. At least a part of the detection device management unit 305 and the unauthorized communication detection unit 306 may be realized by a hardware circuit.

All the IFs 302 to 304 may be one or plural. All the IFs 302 to 304 are, for example, ports. The reception IF 302 is an IF connected to the routing device 102, and is an IF that receives the network-tapped packet from the routing device 102. The alert notification IF 303 is an IF connected to the coping device 104, and is an IF that outputs alert information which is information about the unauthorized communication detected by the unauthorized communication detection unit 306. The configuration IF 304 is an IF that receives information configured in the unauthorized communication determination table 301.

The unauthorized communication determination table 301 is a table used for unauthorized communication determination (determination of whether or not communication is unauthorized communication) performed based on the packet received by the reception IF 302.

The detection device management unit 305 manages the detection device 103. For example, the detection device management unit 305 configures the configuration information (information configured in the table 301) received by the configuration IF 304 in the table 301. The configuration may be performed via or not via the unauthorized communication detection unit 306.

The unauthorized communication detection unit 306 performs the unauthorized communication determination based on the packet received by the received IF 302 by using the unauthorized communication determination table 301, and transmits alert information about the unauthorized communication for which the result of the unauthorized communication determination is true to the coping device 104 via the alert notification IF 303. The processing performed by the unauthorized communication detection unit 306 will be described in detail later.

Figure 4:
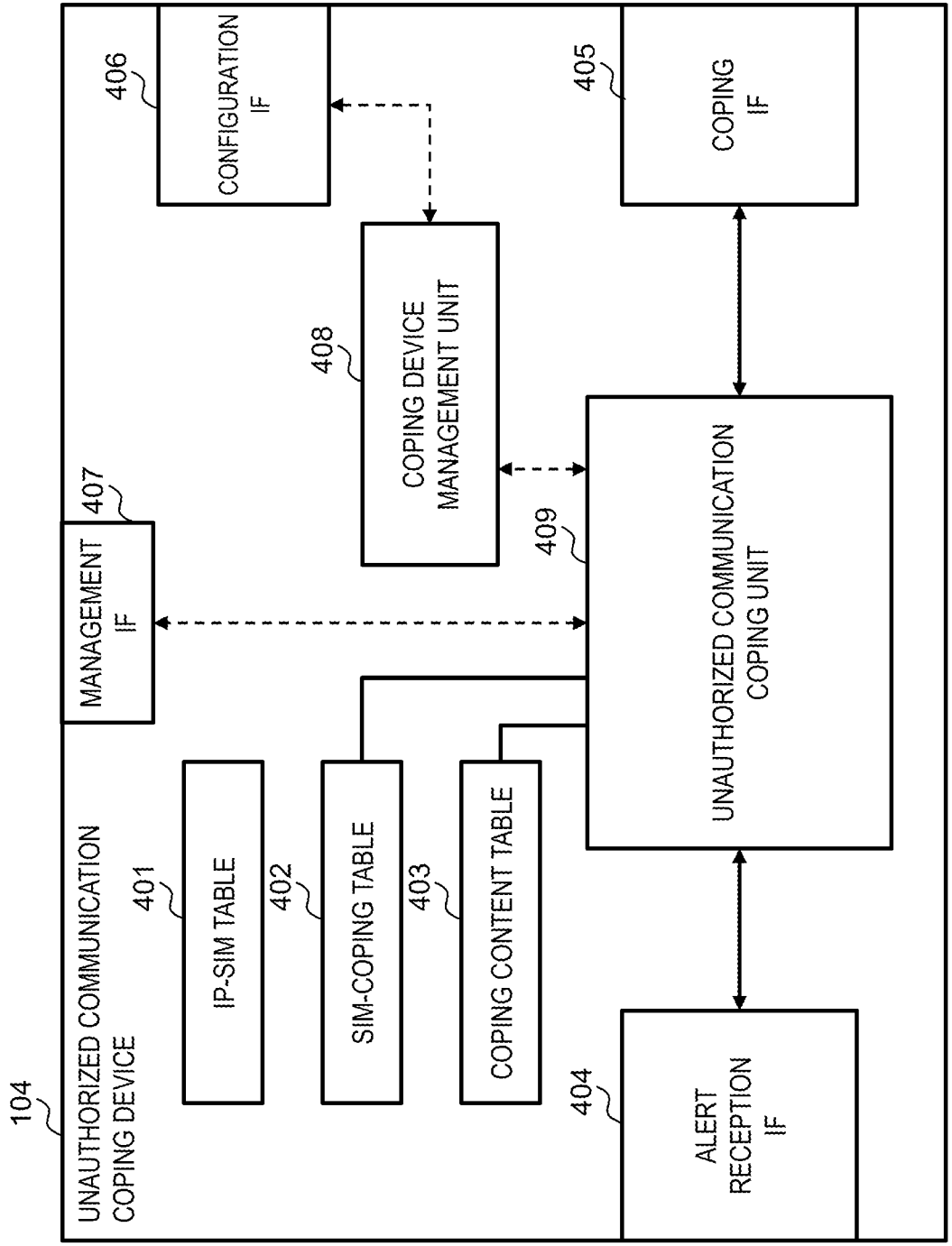
FIG. 4 illustrates a configuration example of an unauthorized communication coping device.

FIG. 4 illustrates a configuration example of the coping device 104.

The coping device 104 may include an interface device, a storage device, and a processor connected to these devices. Examples of the interface device include an alert reception IF 404, a coping IF 405, a configuration IF 406, and a management IF 407. Examples of information stored in the storage device include an IP-SIM table 401, a SIM-coping table 402, and a coping content table 403. Examples of a program stored in the storage device and executed by the processor include a program for realizing functions such as a coping device management unit 408 and an unauthorized communication coping unit 409. At least a part of the coping device management unit 408 and the unauthorized communication coping unit 409 may be realized by a hardware circuit.

All the IFs 404 to 407 may be one or plural. All the IFs 404 to 407 are, for example, ports. The alert reception IF 404 is an IF connected to the detection device 103, and is an IF that receives alert information from the detection device 103. The coping IF 405 is an IF that is connected to at least one of the core network device 109 (for example, C-plane device 105) and the routing device 102, and outputs communication control information that is information for controlling the unauthorized communication. The configuration IF 406 is an IF that receives information configured in at least one of the tables 401 to 403. The management IF 407 is an IF used to provide a management screen (for example, a screen displaying information indicating an incident), and is connected to, for example, an administrator device (not illustrated). The administrator device (not illustrated) may be an information processing terminal (for example, a personal computer or a smartphone) of an administrator. The management screen may be displayed on the administrator device. The administrator device may transmit the configuration information to at least one of the devices 102 to 106.

The IP-SIM table 401 is a table representing a relationship between an IP address and a SIM (ICCID). The SIM-coping table 402 is a table representing a relationship between a SIM (ICCID) and unauthorized communication coping. The coping content table 403 is a table representing contents of the unauthorized communication coping.

The coping device management unit 408 manages the coping device 104. For example, the coping device management unit 408 configures the configuration information (information configured in at least one of the tables 401 to 403) received by the configuration IF 406 in at least one of the tables 401 to 403. The configuration may be performed via or not via the unauthorized communication coping unit 409.

The unauthorized communication coping unit 409 determines the content of the unauthorized communication coping based on the alert information received by the alert reception IF 404 and the tables 401 to 403, and configures the communication control information for the unauthorized communication coping of the determined content in at least one of the core network device 109 and the routing device 102 via the IF 405. The processing performed by the unauthorized communication coping unit 409 will be described in detail later.

Figure 5:
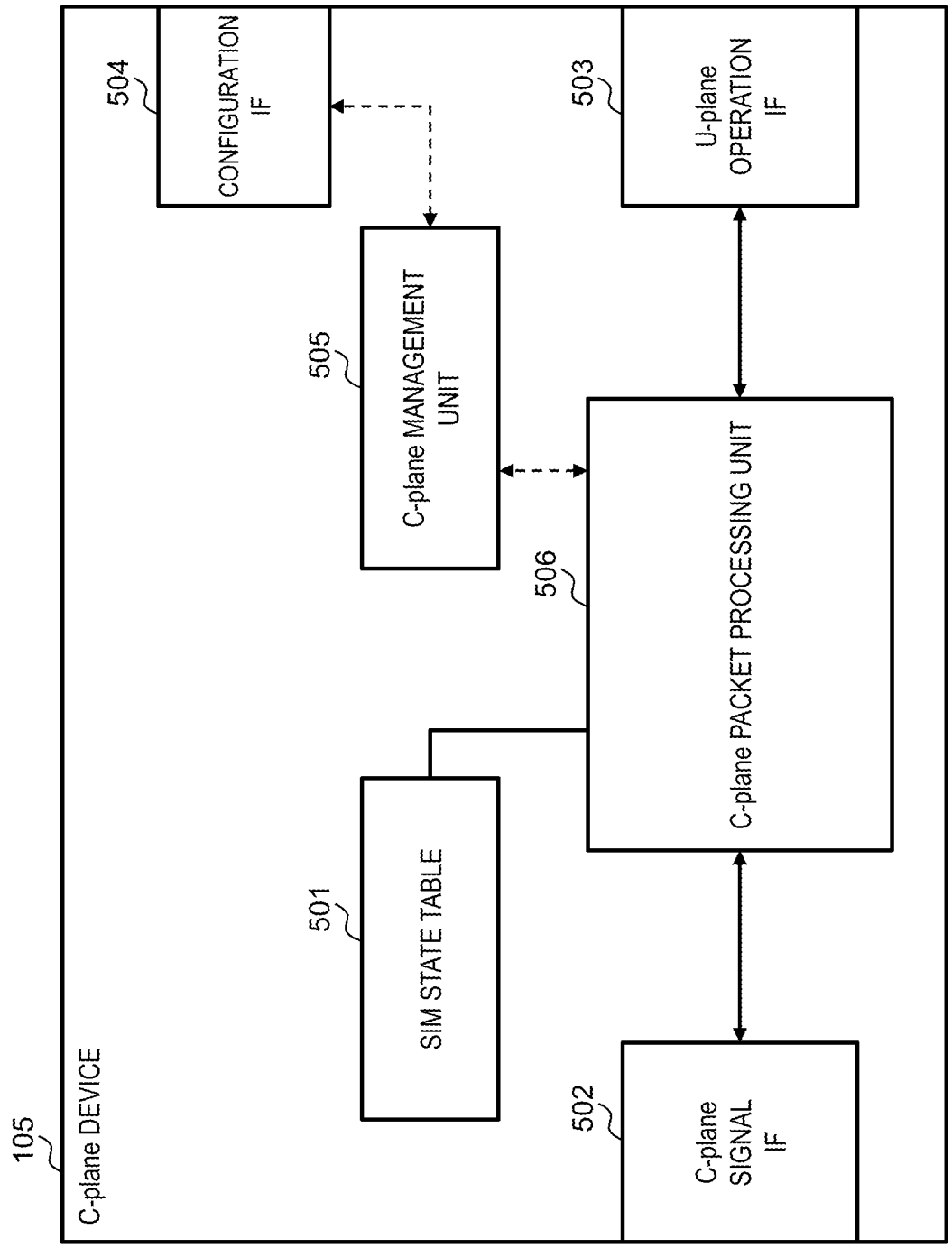
FIG. 5 illustrates a configuration example of a C-plane device.

FIG. 5 illustrates a configuration example of the C-plane device 105.

The C-plane device 105 may include an interface device, a storage device, and a processor connected to these devices. Examples of the interface device include a C-plane signal IF 502, a U-plane operation IF 503, and a configuration IF 504. Examples of information stored in the storage device include a SIM state table 501. Examples of a program stored in the storage device and executed by the processor is a program for realizing functions such as a C-plane management unit 505 and a C-Plane packet processing unit 506. At least a part of the C-plane management unit 505 and the C-Plane packet processing unit 506 may be realized by a hardware circuit.

All the IFs 502 to 504 may be one or plural. All the IFs 502 to 504 are, for example, ports. The C-plane signal IF 502 is an IF connected to a device as control target by a C-plane signal, and is an IF to which the C-plane signal is output. The U-plane operation IF 503 is an IF connected to the U-plane device 106, and is an IF to which a signal for U-plane operation is output. The configuration IF 504 is an IF that receives information configured in the SIM state table 501, and is, for example, an IF connected to the coping device 104.

The SIM state table 501 is a table representing a SIM state for each ICCID.

The C-plane management unit 505 manages the C-plane device 105. For example, the C-plane management unit 505 configures the configuration information (for example, communication control information) received by the configuration IF 504 in the SIM state table 501.

The C-Plane packet processing unit 506 controls transmission and reception of packets via the wireless communication section 111 based on the SIM state table 501. The C-Plane packet processing unit 506 is an example of a function of controlling communication in units of the device IDs based on the communication control information.

Figure 6:
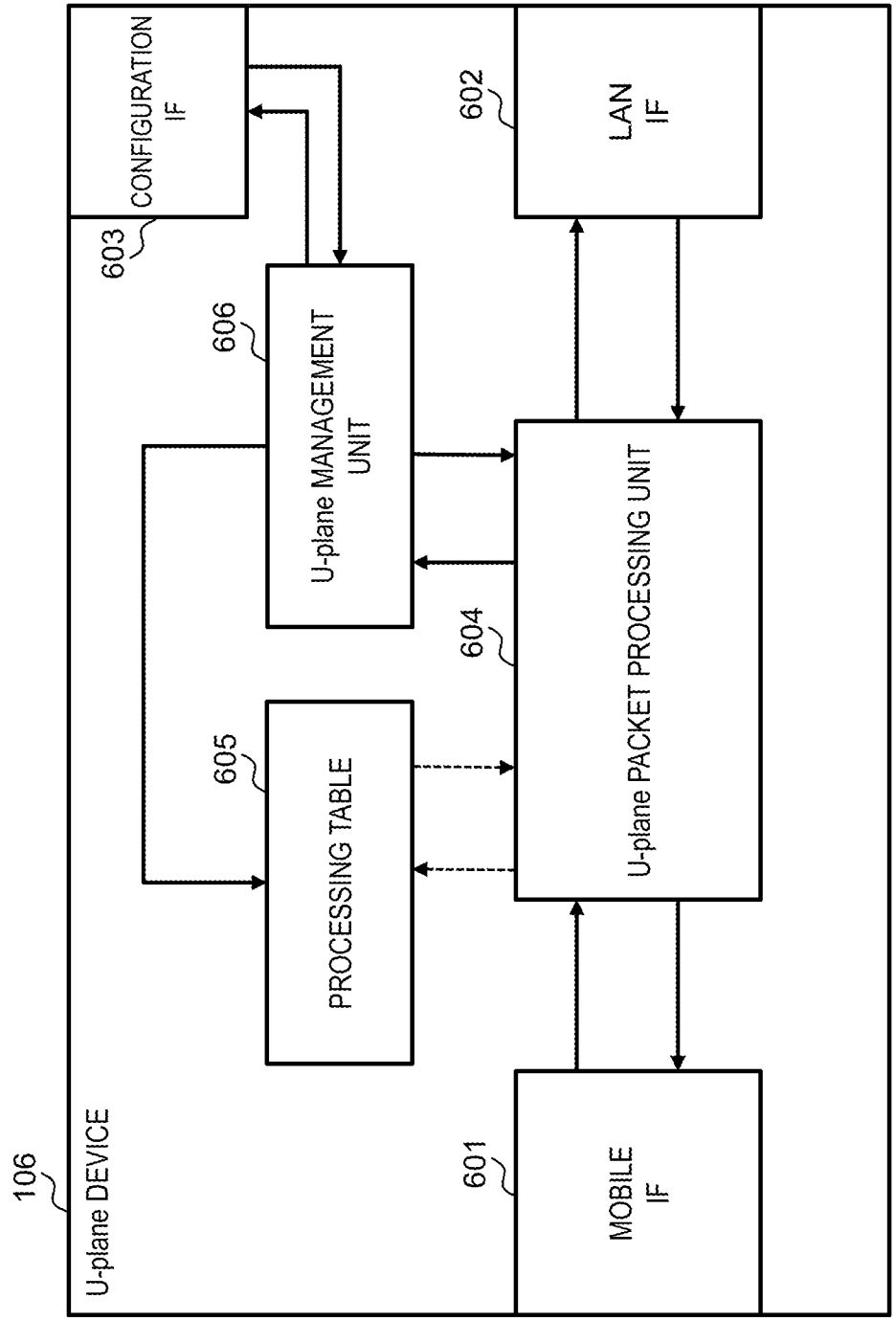
FIG. 6 illustrates a configuration example of a U-plane device.

FIG. 6 illustrates a configuration example of the U-plane device 106.

The U-plane device 106 may include an interface device, a storage device, and a processor connected to these devices. An example of an interface device is a mobile IF 601, a LAN IF 602, and a configuration IF 603.

Examples of information stored in the storage device is a processing table 605. Examples of a program stored in the storage device and executed by the processor is a program for realizing functions such as a U-plane management unit 606 and a U-plane packet processing unit 604. At least a part of the U-plane management unit 606 and the U-plane packet processing unit 604 may be realized by a hardware circuit.

All the IFs 601 to 603 may be one or plural. All the IFs 601 to 603 are, for example, ports. The mobile IF 601 is connected to the base station 108, and transmits and receives packets in a packet format conforming to the wireless communication protocol to and from the base station 108. The LAN IF 602 transmits and receives IP packets based on the packets transmitted and received to and from the base station 108. The configuration IF 603 is an IF that receives information configured in the processing table 605.

The processing table 605 is a table referred to in order to process the packets transmitted and received by the U-plane device 106. The transmission of the packet to the server 107 is "uplink communication", and the transmission of the packet from the server 107 is "downlink communication". The processing table 605 includes an uplink processing table for processing the uplink communication and a downlink processing table for processing the downlink communication.

The U-plane management unit 606 manages the U-plane device 106. For example, the U-plane management unit 606 configures the configuration information received by the configuration IF 603 in the processing table 605. The configuration may be performed via or not via the U-plane packet processing unit 604.

The U-plane packet processing unit 604 receives the packet via the mobile IF 601 or the LAN IF 602, and processes the received packet based on the processing table 605. Specifically, the U-plane packet processing unit 604 transmits the IP packet based on the packet received by the mobile IF 601 via the wireless communication section 111 from the LAN IF 602 to the server 107 via the IP communication section 112 based on the processing table 605 or transmits the packet based on the IP packet received by the LAN IF 602 via the IP communication section 112 from the mobile IF 601 to the terminal 101 via the wireless communication section 111.

FIG. 7 illustrates an example of a management screen 700 provided by the coping device 104.

The management screen 700 is an example of a user interface (UI), for example, a graphical user interface (GUI). The provision of the management screen 700 may correspond to at least a part of the implementation of the unauthorized communication coping. As illustrated in FIG. 7, the management screen 700 is a screen displaying incident information 710 indicating an incident (for example, detection of unauthorized communication). Examples of the incident information 710 include, for each incident, information 711 indicating an incident notification date and time (date and time when the incident is notified), information 712 indicating an incident content (incident details), and information 713 indicating whether or not coping is performed automatically (unauthorized communication coping is already performed automatically). For the automatically coped incident, the information 713 may indicate a coping ID corresponding to the unauthorized communication coping.

Note that, the unauthorized communication coping unit 409 may receive an inquiry using the coping ID as a key via the management screen 700. When the unauthorized communication coping unit 409 receives the inquiry, the coping content corresponding to the coping ID may be specified from the coping content table 403, and information indicating the specified coping content may be provided to the administrator via the management screen 700 (or another UI).

Further, the management screen 700 is an example of a UI for notifying an incident, or is also an example of a UI for making an inquiry about whether or not to approve the implementation of the unauthorized communication coping and accepting approval for the implementation. When the approval for the implementation of the unauthorized communication coping is accepted, the approved unauthorized communication coping may be implemented. The inquiry about whether or not to approve the implementation of the unauthorized communication coping and the acceptance of the approval for the implementation may also be a part of the implementation of the unauthorized communication coping.

Further, the information 712 indicating the incident content may be a document in which the incident content or the coping content is documented according to a sentence conversion rule prepared in advance, or may be information indicating a manually input coping content.

Hereinafter, various tables will be described. Note that, in the present embodiment, when there are administrators of different organizations (for example, different companies or different departments) or different management authorities, access control that allows accessing such as browsing or updating only a portion of the table having the management authority may be configured in at least one table.

FIG. 8 illustrates a configuration example of the filtering rule table 201.

The filtering rule table 201 has a record for each filtering rule. Each record has information such as base station IP address 801, a MBH QCI 802, a transmission source IP address 803, a transmission source port number 804, a destination IP address 805, a destination port number 806, a protocol 807, and a routing action ID 808. One filtering rule is used as an example ("target routing action" in the description in FIG. 8). Note that, for example, the records may be in ascending (or descending) order of priority of the filtering rule.

The base station IP address 801 indicates an IP address of the base station 108 to which the packet for which the target filtering rule is adopted is transmitted and received. The MBH QCI 802 indicates MBH QCI, which is QoS Class Identifier (QCI) designated by the packet in the MBH which is the wireless communication section 111, designated by the packet for which the target filtering rule is adopted.

The transmission source IP address 803, the transmission source port number 804, the destination IP address 805, and the destination port number 806 indicate a transmission source IP address, a transmission source port number, a destination IP address, and a destination port number which are described in the IP header in the packet for which the target filtering rule is adopted. The protocol 807 indicates a protocol used to communicate the IP packet for the packet for which the target routing action is adopted.

The routing action ID 808 indicates an ID of a routing action of the packet for which the target filtering rule is adopted.

For each of the information 801 to 807, "Any" means that any value can be used.

FIG. 9 illustrates a configuration example of the routing action table 202.

The routing action table 202 has a record for each routing action. Each record has information such as a routing action ID 901, an action 902, and a destination IF 903. One routing action is used as an example ("target routing action" in the description of FIG. 8).

The routing action ID 901 indicates an ID of the target routing action. The action 902 indicates a content of the target routing action. The destination IF 903 indicates an IF of the destination of the packet according to the target routing action.

According to the illustrated tables 201 and 202 in FIGS. 8 and 9, for example, the filtering rule is as follows.

A packet in communication corresponding to a first record of the filtering rule table 201 simply passes through the routing device 102 since there is no routing action ID 808 other than "RA000".

A packet in communication corresponding to a second record of the filtering rule table 201 is blocked without passing through the routing device 102 and is network-tapped since the routing action IDs 808 are "RA999" and "RA001".

A packet in communication corresponding to a third record of the filtering rule table 201 passes through the routing device 102 and is network-tapped since the routing action IDs 808 are "RA000" and "RA001".

A set of the transmission source IP address and the destination IP address defines communication in units of the pairs of the transmission source and the destination. A set that includes the transmission source port number, the destination port number, and the protocol in addition to the transmission source IP address and the destination IP address defines an IP flow in communication in units of the pairs of the transmission source and the destination. In the present embodiment, it is possible to detect and cope with both the unauthorized communication in units of the pairs of the transmission source and the destination and the unauthorized communication in units of the IP flows.

Further, although the network-tapped packets may be all the packets received by the routing device 102 regardless of whether the communication is the uplink communication or the downlink communication, according to the examples illustrated in FIGS. 8 and 9, the network-tapped packet may be an IP packet having an IP header including information satisfying a predetermined condition. among the IP packets included in the packet as the routing target. The "IP header including information satisfying a predetermined condition" may be, for example, an IP header including an IP address and a port number matching the IP address and the port number designated in the filtering rule. As a result, since the number of packets transmitted to the detection device 103 is reduced, the number of packets analyzed by the detection device 103 is reduced, and thus, a processing load of the detection device 103 can be reduced. Further, it can also be expected that analysis of IP packets to be excluded from analysis is avoided due to contracts.

FIG. 10 illustrates a configuration example of an unauthorized communication determination table 301A. FIG. 20 illustrates a configuration example of an unauthorized communication determination table 301B.

As described above, in the present embodiment, it is possible to detect and cope with both the unauthorized communication in units of the pairs of the transmission source and the destination and the unauthorized communication in units of the IP flows. The unauthorized communication determination table 301A is a table used to determine whether or not the specified communication in units of the pairs of the transmission source and the destination is the unauthorized communication, and the unauthorized communication determination table 301B is a table used to determine whether or not the specified IP flow is the unauthorized communication. Note that, since the unauthorized communication determination table 301B is a more detailed table, when the unauthorized communication determination table 301B is present, the unauthorized communication determination table 301A may not be present.

As illustrated in FIG. 10, the unauthorized communication determination table 301A has a record for each pair of the transmission source and the destination. Each record has information such as a transmission source IP address 1001, a destination IP address 1002, the amount of communication 1003, the number of packets 1004, a packet size 1005, and a non-communication time 1006. One pair is used as an example ("target pair" in the description of FIG. 10).

The transmission source IP address 1001 and the destination IP address 1002 indicate the transmission source and destination IP addresses that constituting the target pair.

The information 1003 to the information 1006 are examples of conditions in which the communication of the target pair is the unauthorized communication or the basis of the condition. The amount of communication 1003 indicates the amount of communication of the communication of the target pair. The number of packets 1004 indicates the number of packets in the communication of the target pair. The packet size 1005 indicates a size of the packet in the communication of the target pair. The non-communication time 1006 indicates a duration in which the communication of the target pair is not performed.

As illustrated in FIG. 20, the unauthorized communication determination table 301B has a record for each IP flow. Each record has information such as a transmission source port number 2011, a destination port number 2012, and a protocol 2013 in addition to the information 1001 to the information 1006 illustrated in FIG. 10. The transmission source port number 2011, the destination port number 2012, and the protocol 2013 indicate the transmission source port number, the destination port number, and the protocol that are elements of the definition of the IP flow respectively.

The conditions for determining that the communication of the pair of the transmission source and the destination is the unauthorized communication may be defined in advance. For example, when the pair of the transmission source and the destination is not specified from either the table 301A or 301B, the communication of the pair may be determined as the unauthorized communication. When the pair of the transmission source and the destination is specified from either the table 301A or 301B, whether or not a difference between a behavior of the communication of the pair (or the IP flow including the pair) (for example, the amount of communication in a certain time, the number of packets, an average of the packet sizes, and the non-communication time) and a situation indicated by the information 1003 to the information 1006 corresponding to the pair (or the IP flow) is equal to or less than a certain amount may be used as the condition. Also, whether the behavior of the communication of the pair (or the IP flow) exceeds (or fall below) at least a part of the information 1003 to the information 1006 corresponding to the pair may be used as the condition.

FIG. 11 illustrates a configuration example of the IP-SIM table 401.

The IP-SIM table 401 has a record for each device (SIM card). Each record has information such as an IP address 1101 and an ICCID 1102. One device is used as an example ("target device" in the description of FIG. 11).

The IP address 1101 indicates an IP address of the target device. "Other" means that any IP address other than the IP address described in the table 401 may be used. In the present embodiment, for any server 107 of one or more servers 107, an IP address of the server 107 corresponds to "Other", and "server" is configured as an ICCID of the server 107. A pair of the IP address and the ICCID may be defined for each server 107. Further, in the present embodiment, as represented in the IP-SIM table 401, a relationship between the IP address and the ICCID may be fixed without being dynamically changed.

FIG. 12 illustrates a configuration example of a SIM-coping table 402A. FIG. 21 illustrates a configuration example of a SIM-coping table 402B.

The SIM-coping table 402A is a table used to determine the coping content of the detected unauthorized communication in units of the pairs of the transmission source and the destination, and the SIM-coping table 402B is a table used to determine the coping content of the detected IP flow as the unauthorized communication. Note that, since the SIM-coping table 402B is a more detailed table, when the SIM-coping table 402B is present, the SIM-coping table 402A may not be present.

The SIM-coping table 402A has a record for each pair of the transmission source and the destination as illustrated in FIG. 12. Each record has information such as a transmission source ICCID 1201, a destination ICCID 1202, and a coping ID 1203. One pair is used as an example ("target pair" in the description of FIG. 12).

The transmission source ICCID 1201 and the destination ICCID 1202 indicate transmission source and destination ICCIDs constituting the target pair. The coping ID indicates a coping ID corresponding to the target pair.

The SIM-coping table 402B has a record for each IP flow as illustrated in FIG. 21. Each record has information such as a transmission source port number 2311, a destination port number 2312, and a protocol 2313 in addition to the information 1201 to the information 1203 illustrated in FIG. 12. The transmission source port number 2311, the destination port number 2312, and the protocol 2313 indicate a source port number, a destination port number, and a protocol that are elements of the definition of the IP flow.

FIG. 13 illustrates a configuration example of the coping content table 403.

The coping content table 403 has a record for each unauthorized communication coping. Each record has information such as a coping ID 1301, an application type 1302, and a coping content 1303. Hereinafter, one unauthorized communication coping is used as an example ("target coping" in the description of FIG. 13).

The coping ID 1301 indicates a coping ID of the target coping. The application type 1302 indicates the importance of the communication (in other words, a priority for maintaining the communication) for the business execution of the user. The coping content 1303 indicates a content (details) of the target coping.

According to the example illustrated in FIG. 13, the coping content includes disabling of the SIM card 113 or blocking of the IP flow. The disabling the SIM card 113 is an example of the blocking the communication in units of the pairs of the transmission source and the destination. Bandwidth limitation may be adopted instead of the blocking. The coping content may include an inquiry to the administrator regarding the approval or disapproval of the coping content of the unauthorized communication (and the implementation of the content). That is, the unauthorized communication coping may be, for example, at least one of the following (a) to the following (f). Thus, it can be expected that appropriate coping is performed when the unauthorized communication is detected in both the communication in units of the pairs of the transmission source and the destination and the IP flow as a part of the communication. (a) To configure communication control information that means the disabling or the bandwidth limitation of the ICCID corresponding to the IP address for the core network device 109 (for example, C-plane device 105) for at least one of the transmission source and the destination of the detected unauthorized communication. (b) To transmit a notification indicating that (a) is performed, for example, to the administrator device used by the administrator. (c) To make an inquiry about the approval or disapproval of performing (a), and perform (a) when the approval is obtained in response to the inquiry. (d) To configure communication control information that means the blocking or the bandwidth limitation of the IP flow for the routing device 102 for at least one of the transmission source and the destination of the detected unauthorized communication. (e) To transmit a notification indicating that (d) is performed, for example, to the administrator device used by the administrator. (f) To make an inquiry about the approval or disapproval of performing (d), and perform (d) when the approval is obtained in response to the inquiry.

FIG. 14 illustrates a configuration example of the SIM state table 501.

The SIM state table 501 has a record for each device (for example, SIM card 113) that can be either the transmission source or the destination. Each record has information such as an ICCID 401 and a state 1402. The ICCID 1401 indicates an ICCID of the device (SIM card 113) (a value "server" may be adopted). The state 1402 indicates a state of the device (for example, "enabled" or "disabled"). "Disabled" in the state 1402 is an example of communication control information for communication in units of the pairs of the transmission source and the destination, and means that the communication of the device corresponding to the state is blocked.

FIG. 15 illustrates a configuration example of an uplink processing table 605U.

The uplink processing table 605U is one of the processing tables 605 in the U-plane device 106, and is a table for processing the uplink communication. The uplink processing table 605U has a record for each terminal 101. Each record has information such as an ICCID 1501, a M-ID 1502, an APN 1503, and a QCI 1504. One terminal 101 is used as an example ("target terminal 101" in the description of FIG. 15).

The ICCID 1501 indicates an ID of the SIM card 113 of the target terminal 101. The M-ID 1502 indicates an ID of the target terminal 101 (for example, an IP address or an ID for uniquely identifying the device in the system). The APN 1503 indicates an access point name (APN) designated in the communication of the target terminal 101.

FIG. 16 illustrates a configuration example of a downlink processing table 605D.

The downlink processing table 605D is one of the processing tables 605 in the U-plane device 106, and is a table for processing the downlink communication. The downlink processing table 605D has a record for each terminal 101. Each record has information such as an ICCID 1601, a M-ID 1602, and an APN 1603. The information 1601 to the information 1603 are similar to the information 1501 to the 1503 described with reference to FIG. 15.

Hereinafter, an example of the processing performed in the present embodiment will be described.

Figure 17:
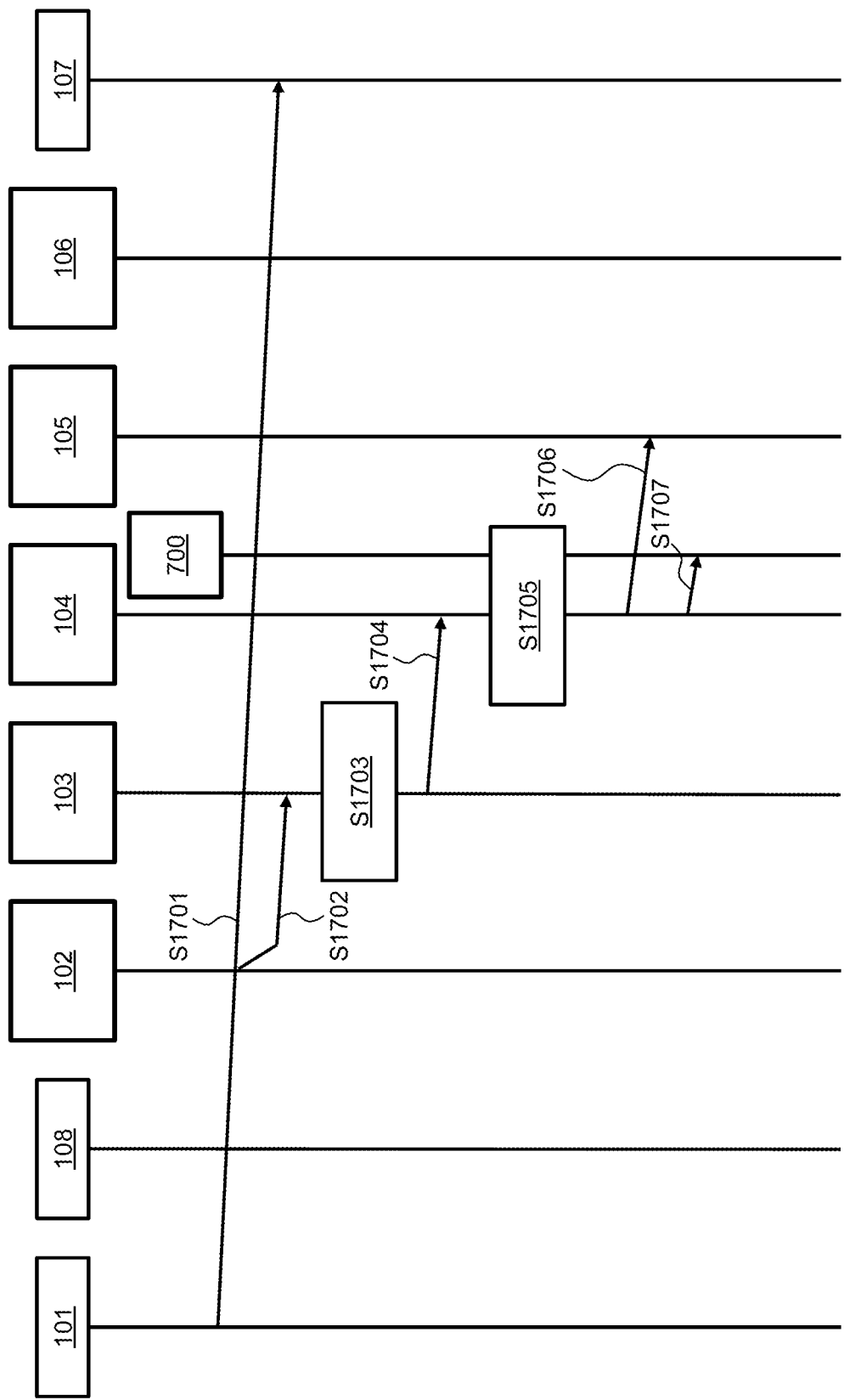

FIG. 17 illustrates an example of a flow of a first case where the unauthorized communication is detected and coped with. The first case is a case where the unauthorized communication is detected and coped with for the communication in units of the pairs of the transmission source and the destination.

It is assumed that malware invades a certain terminal 101 and unauthorized communication with a certain server 107 as an attack target is performed from the terminal 101 in which the malware invades (S1701).

In the routing device 102, the routing processing unit 208 determines whether or not the packet in the communication corresponds to the filtering rule (information 801 to information 807) indicated by any record in the filtering rule table 201.

Here, since a communication set including the transmission source IP address and the destination IP address specified from the packet corresponds to the routing action ID 808 "RA001" (network tap), the packet is network-tapped, and the network-tapped IP packet is transmitted to the detection device 103 (S1702). The "communication set" mentioned herein is referred to as a "target communication set" in the description with reference to FIGS. 17 to 19.

In the detection device 103, whenever the network-tapped IP packet is received from the routing device 102, the unauthorized communication detection unit 306 analyzes the IP packet (S1703), and stores information indicating the analysis result in the storage device. When the unauthorized communication detection unit 306 detects that the communication for the target communication set is the unauthorized communication based on the unauthorized communication determination table 301A (see FIG. 10) based on the analysis result for the target communication set (or statistics of the analysis result of the IP packet in a certain time for the target communication set), the unauthorized communication detection unit transmits the alert information indicating the information about the detected unauthorized communication to the coping device 104 (S1704).

In the coping device 104, the unauthorized communication coping unit 409 specifies the coping content based on the alert information and the tables 401, 402A (see FIG. 12), and 403 (S1705). Depending on the specified coping content, the unauthorized communication coping unit 409 may configure the communication control information (disabling of the SIM card 113 corresponding to the ICCID) for the core network device 109 (C-plane device 105) (S1706), and notify the incident information via the management screen 700 (S1707). Note that, the configuration of S1706 may be performed in response to a manual operation from the administrator who views the information notified in S1707.

Figure 18:
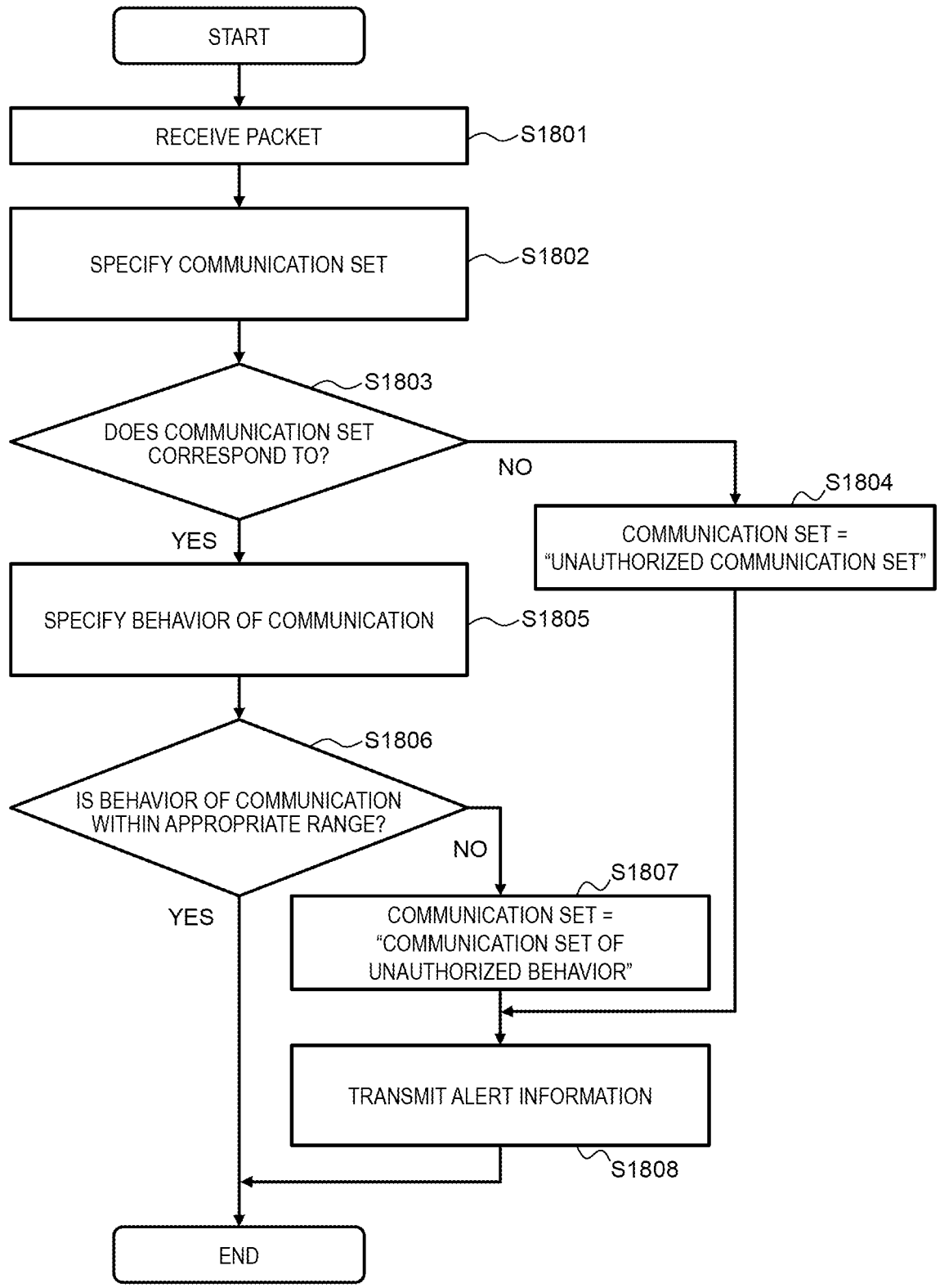
FIG. 18 illustrates an example of a processing flow of an unauthorized communication detection unit in the first case.

FIG. 18 illustrates an example of a processing flow of the unauthorized communication detection unit 306 in the first case. This processing includes S1703 and S1704 illustrated in FIG. 17.

The unauthorized communication detection unit 306 receives the network-tapped packet (S1801), and specifies the communication set including the information indicating the transmission source IP address and the destination IP address by analyzing the received packet (S1802). The communication set may further include the information indicating the transmission source port number, the destination port number, and the protocol.

The unauthorized communication detection unit 306 determines whether or not information indicating a pair matching the pair of the transmission source IP address and the destination IP address in the communication set specified in S1802 is present in the unauthorized communication determination table 301A (or 301B) (S1803). When the determination result of S1803 is false (S1803: NO), the unauthorized communication detection unit 306 determines that the communication set specified in S1802 is an "unauthorized communication set" (S1804).

When the determination result of S1803 is true (S1803: YES), the unauthorized communication detection unit 306 specifies the behavior of the communication (the amount of communication, the number of packets, the packet size, and the non-communication time) for the communication set based on the packet analysis result performed for the communication set in a certain time (S1805). The unauthorized communication detection unit 306 determines whether or not the behavior of the communication specified in S1805 is within an appropriate range based on the record corresponding to the communication set specified in S1802 in the unauthorized communication determination table 301A (or 301B) (S1806). The "behavior of the communication is within an appropriate range" means that the behavior does not correspond to the behavior as the unauthorized communication based on the information 1003 to the information 1006 indicated by the record. When the determination result of S1806 is true (S1806: YES) (that is, when the behavior of the communication specified in S1805 does not correspond to the behavior as the unauthorized communication), the processing is ended.

When the determination result of S1806 is false (S1806: NO) (that is, when the behavior of the communication specified in S1805 corresponds to the behavior as the unauthorized communication), the unauthorized communication detection unit 306 determines that the communication set specified in S1802 is the "communication set of the unauthorized behavior" (S1807).

When S1804 or S1807 is performed, the unauthorized communication detection unit 306 transmits the alert information about the unauthorized communication corresponding to the "unauthorized communication set" or the "communication set of the unauthorized behavior" for the communication set specified in S1802 (S1808). Since the first case is the unauthorized communication detection in units of the pairs of the transmission source and the destination, the alert information includes the information indicating the IP address of each of the pairs of the transmission source and the destination (IP address specified by the analysis of the packet received in S1801) and the detected unauthorized communication (for example, the "unauthorized communication set" or the "communication set of the unauthorized behavior").

Figure 19:
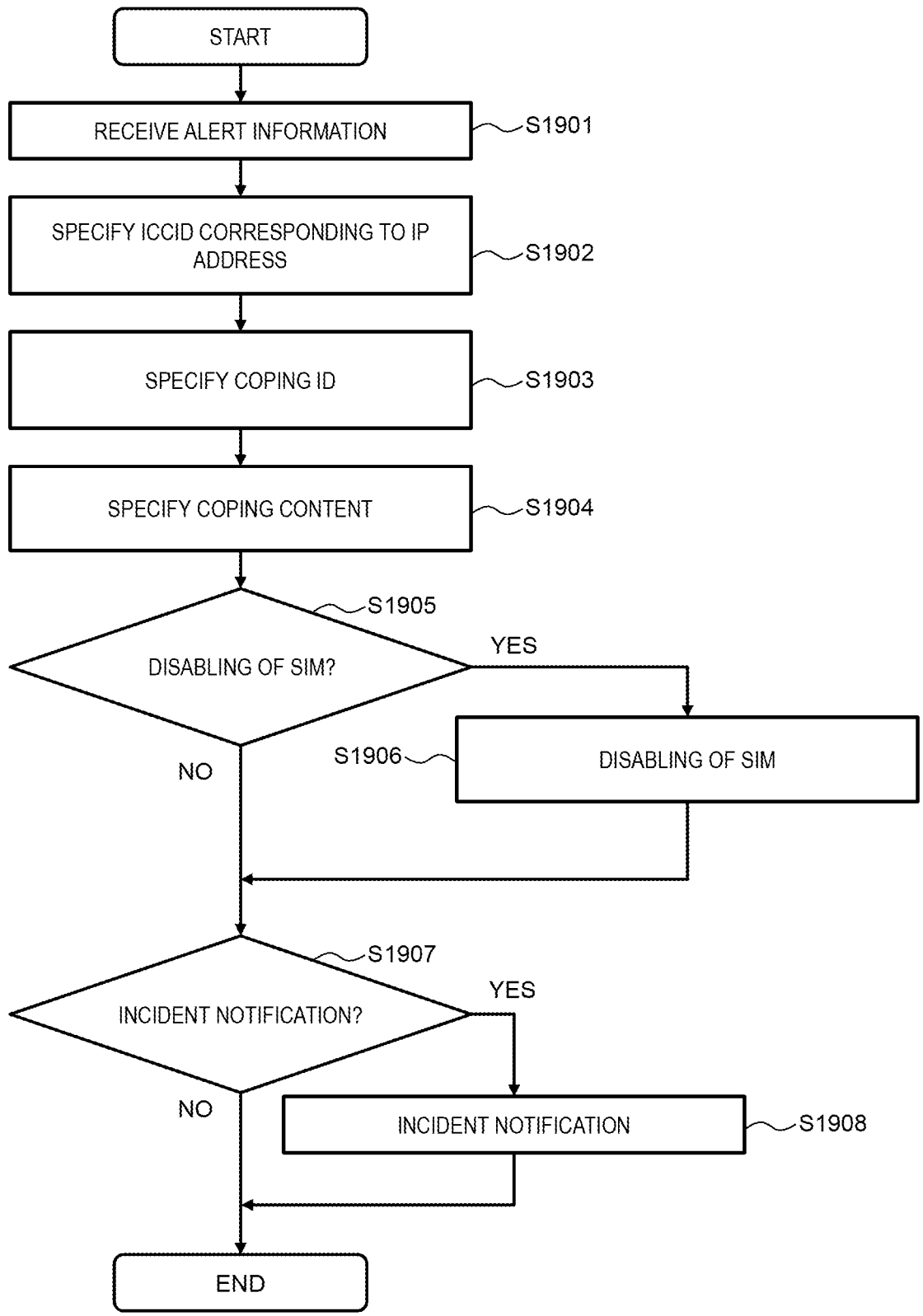
FIG. 19 illustrates an example of a processing flow of an unauthorized communication coping unit in the first case.

FIG. 19 illustrates an example of a processing flow of the unauthorized communication coping unit 409 in the first case. This processing includes S1705 to S1707 illustrated in FIG. 17.

The unauthorized communication coping unit 409 receives the alert information from the detection device 103 (S1901). The unauthorized communication coping unit 409 specifies the IP address from the alert information received in S1901 for each of the transmission source and the destination, and specifies the ICCID corresponding to the IP address from the IP-SIM table 401 (S1902). The unauthorized communication coping unit 409 specifies the coping ID corresponding to the pair of the ICCIDs of transmission source and the destination (ICCIDs specified in S1902) from the SIM-coping table 402A (S1903). The unauthorized communication coping unit 409 specifies the coping content 1303 corresponding to the coping ID specified in S1903 from the coping content table 403 (S1904).

When the coping content 1303 specified in S1904 includes the disabling of the SIM (for example, "disabling of the transmission source SIM and the destination SIM") (S1905: YES), the unauthorized communication coping unit 409 configures "disabled" in the state 1402 corresponding to the ICCID specified in S1902 in the SIM state table 501 of the C-plane device 105 (S1906).

When the coping content 1303 specified in S1904 includes the incident notification (for example, "incident notification on management screen") (S1907: YES), the unauthorized communication coping unit 409 notifies of the information indicating the incident (for example, the detected unauthorized communication and the content of the implemented unauthorized communication coping) through the management screen 700 (S1908).

According to the examples illustrated in FIGS. 17 to 19, the unauthorized communication coping unit 409 specifies the ICCID 1102 corresponding to the IP address for both (or one of) the transmission source IP address and the destination IP address indicated by the alert information based on the IP-SIM table 401. The unauthorized communication coping includes configuring the communication control information which is information for controlling the communication of the device identified from the specified ICCID in at least one of the routing device 102 and the core network device 109. As a result, the unauthorized communication can be coped with in any unit of different units such as units of the devices (for example, SIM card 113), units of the pairs of the device and the device, and units of the IP flows in the pairs of the device and the device. For example, the unauthorized communication coping unit 409 configures "disabled" in the state 1402 of the ICCID corresponding to the IP address in the SIM state table 501 of the C-plane device 105 for at least one of the transmission source and the destination of the detected unauthorized communication. As a result, the unauthorized communication can be coped with in units of the devices or in units of the pairs of the device and the device. Note that, when it is necessary to constantly detect and cope with the unauthorized communication in units of the IP flows (that is, when it is not necessary to configure the communication control information for the core network device 109), the transmission source IP address and the destination IP address specified from the alert information may not be converted into the ICCID to cope with the unauthorized communication.

Figure 22:
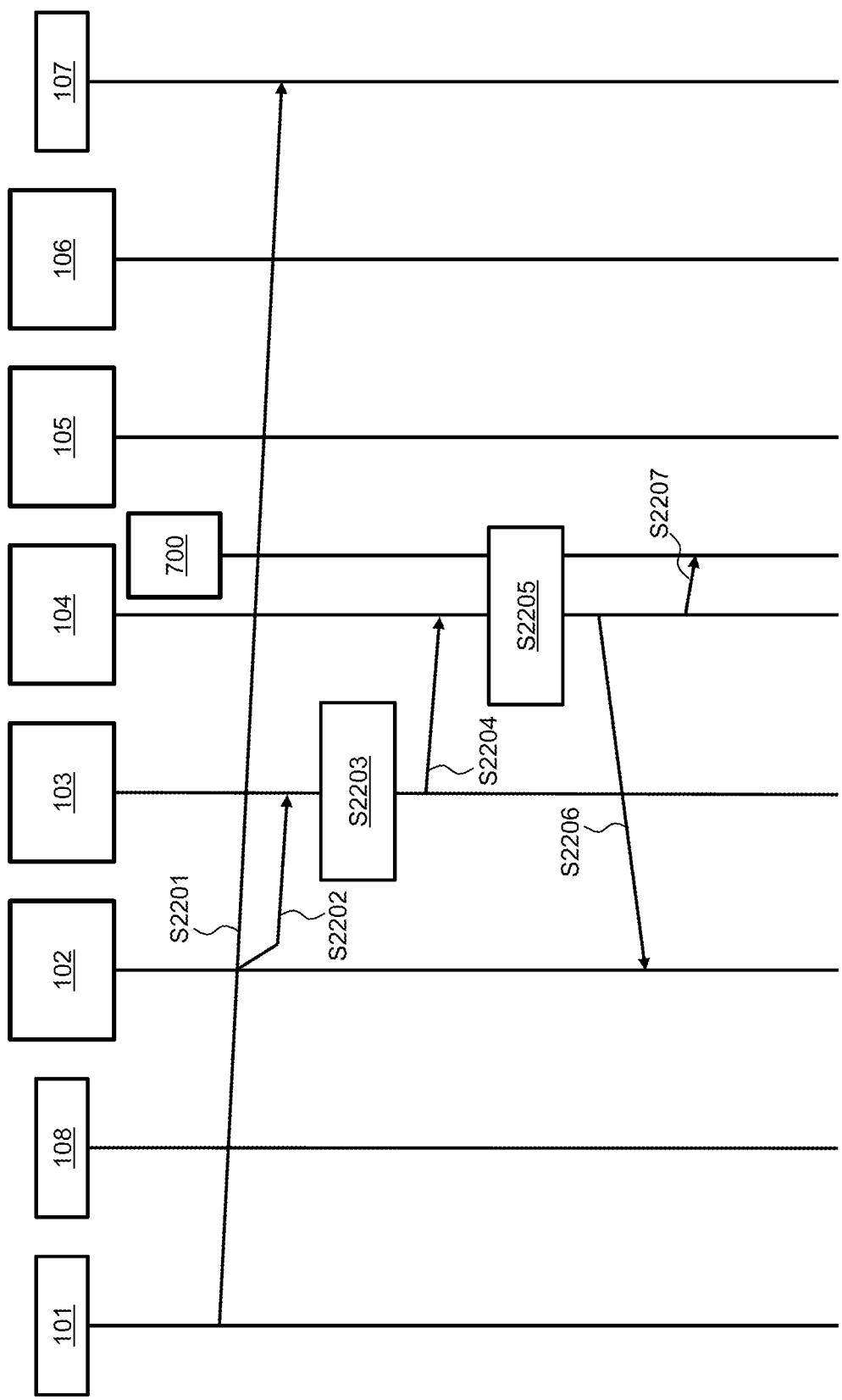

FIG. 22 illustrates an example of a flow of a second case where the unauthorized communication is detected and coped with. The second case is a case where the unauthorized communication is detected and coped with for the communication as the IP flow.

It is assumed that malware invades a certain terminal 101 and an unauthorized communication with a certain server 107 as an attack target is performed from the terminal 101 in which the malware invades (S2201).

In the routing device 102, the routing processing unit 208 determines whether or not the packet in the communication corresponds to the filtering rule (information 801 to information 807) indicated by any record in the filtering rule table 201.

Here, since the communication set including the transmission source IP address, the transmission source port number, the destination IP address, the destination port number, and the protocol specified from the packet corresponds to the routing action ID 808 "RA001" (network tap), the packet is network-tapped, and the network-tapped IP packet is transmitted to the detection device 103 (S2202). The "communication set" mentioned herein is referred to as a "target communication set" in the description with reference to FIGS. 22 and 23.

In the detection device 103, whenever the network-tapped IP packet is received from the routing device 102, the unauthorized communication detection unit 306 analyzes the IP packet (S2203), and stores the information indicating the analysis result in the storage device. When the unauthorized communication detection unit 306 detects that the IP flow for the target communication set is the unauthorized communication based on the unauthorized communication determination table 301B (see FIG. 20) based on the analysis result for the target communication set or statistics of the analysis result of the IP packet in a certain time for the target communication set, the unauthorized communication detection unit transmits the alert information indicating the information about the detected unauthorized communication to the coping device 104 (S2204).

In the coping device 104, the unauthorized communication coping unit 409 specifies the coping content based on the alert information and the tables 401 and 402B (see FIG. 21) and 403 (S2205). Depending on the specified coping content, the unauthorized communication coping unit 409 may configure the communication control information (blocking of the IP flow) for the routing device 102 (S2206), and notify the incident information via the management screen 700 (S2207). Note that, the configuration of S2206 may be performed in response to a manual operation from the administrator who views the information notified by S2207.

The example of the processing flow of the unauthorized communication detection unit 306 in the second case may be the same as the example illustrated in FIG. 18. Examples of the processing in the second case include S2203 and S2204. The communication set specified in S1802 is the communication set including the transmission source IP address, the source port number, the destination IP address, the destination port number, and the protocol, and indicates the IP flow.

Figure 23:
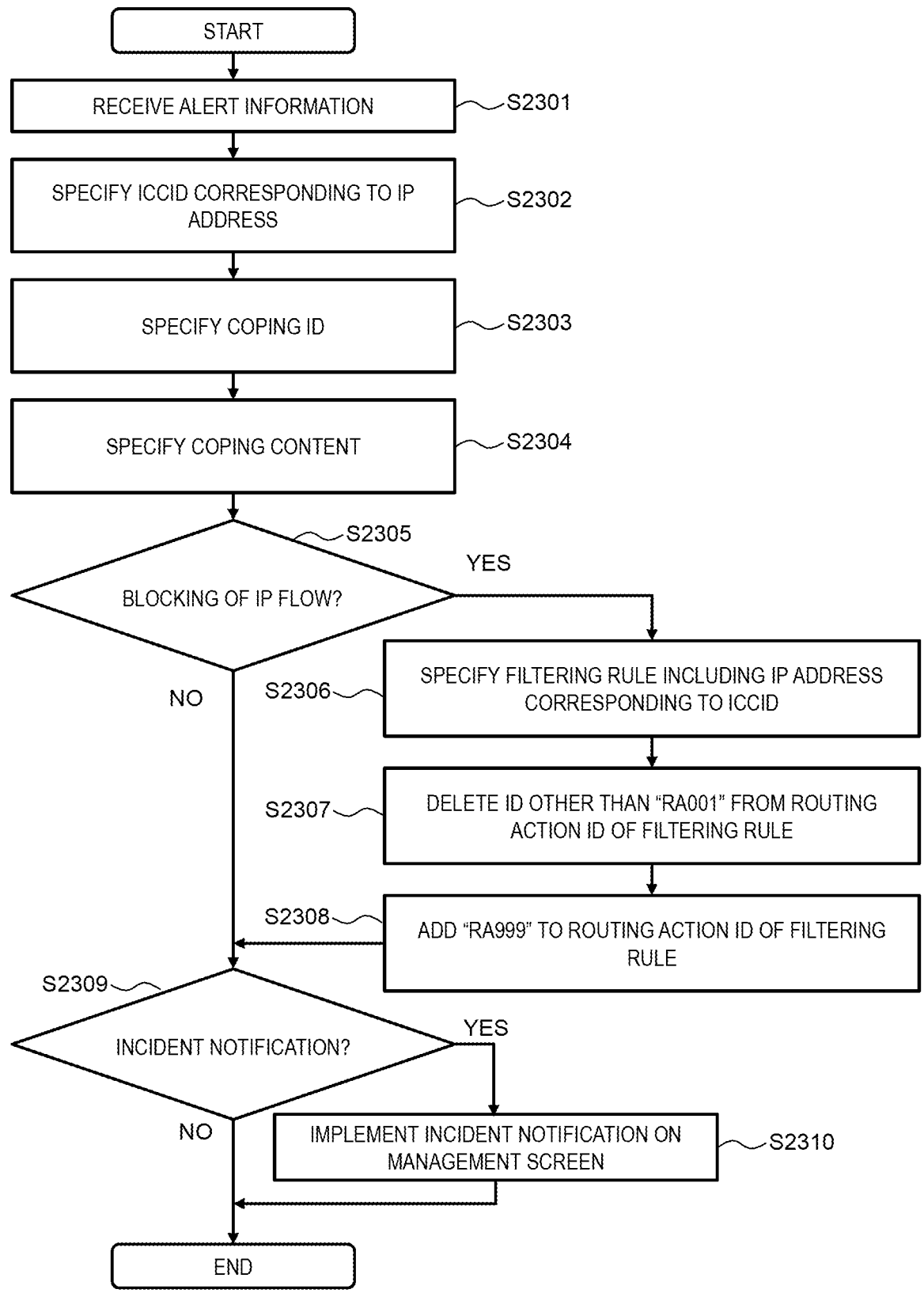
FIG. 23 illustrates an example of a processing flow of the unauthorized communication coping unit in the second case.

FIG. 23 illustrates an example of a processing flow of the unauthorized communication coping unit 409 in the second case. This processing includes S2205 to S2207 illustrated in FIG. 22.

The same processing as S1901 to S1904 is performed (S2301 to S2304). The alert information includes the information indicating the detected IP flow (combination of transmission source IP address, transmission source port number, destination IP address, destination port number, and protocol) as the unauthorized communication.

When the coping content 1303 specified in S2304 includes "blocking of the IP flow" (S2305: YES), the unauthorized communication coping unit 409 specifies the filtering rule including the IP address (for each of the transmission source and the destination) corresponding to the ICCID specified in S2302 from the filtering rule table 201 (S2306). The unauthorized communication coping unit 409 deletes an action ID other than "RA001" (network tap) from the routing action ID 808 corresponding to the filtering rule specified in S2306 (S2307). The unauthorized communication coping unit 409 adds "RA999" (blocking) to the routing action ID 808 corresponding to the filtering rule specified in S2306 (S2308).

When the coping content 1303 specified in S2304 includes the incident notification (for example, "incident notification on management screen") (S2309: YES), the unauthorized communication coping unit 409 notifies of the information indicating the incident (for example, the detected unauthorized communication and the content of the implemented unauthorized communication coping) through the management screen 700 (S2310).

According to FIGS. 17 to 23 (particularly, the examples illustrated in FIGS. 22 and 23), the unauthorized communication coping unit 409 configures, as an example of the communication control information of the IP flow, "RA999" (blocking) as the routing action ID 808 corresponding to the filtering rule to which the IP flow corresponds in the filtering rule table 201 of the routing device 102 for both (or one of) the transmission source and the destination of the detected unauthorized communication. As a result, it is possible to cope with unauthorized communication in units of the IP flows.

Further, the unauthorized communication coping unit 409 determines the coping content for at least one of the transmission source and the destination of the detected unauthorized communication (for example, the transmission source and the destination specified from the alert information) based on the coping management information (for example, the tables 401 to 403 represented in FIGS. 11 to 13 respectively) which is the information indicating the coping content indicating the unauthorized communication coping to be performed in units of communication that is one or both of the transmission source and the destination, and performs the unauthorized communication coping according to the determined coping content. As a result, it can be expected that the unauthorized communication suitable for the content (for example, characteristics or type) of the detected unauthorized communication is coped with. Specifically, for example, the following coping is performed. In other words, it can be expected that appropriate coping (determination of a coping destination and determination of information configured as the coping) is performed according to whether the detected unauthorized communication is in units of the pairs of the transmission source and the destination or in units of the IP flows.

When the determined coping content 1303 includes the communication control in units of SIM, the unauthorized communication coping unit 409 configures the communication control information for the ICCID corresponding to the IP address for the C-plane device 105 for at least one of the transmission source and the destination of the unauthorized communication. On the other hand, for example:

When the determined coping content 1303 is the communication control in units of the IP flows, the unauthorized communication coping unit 409 configures the communication control information for the IP flow for the routing device 102 for at least one of the transmission source and the destination of the unauthorized communication.

Although the present disclosure has been described with reference to example embodiments, those skilled in the art will recognize that various changes and modifications may be made in form and detail without departing from the spirit and scope of the claimed subject matter.

For example, the present invention is not limited to a system capable of coping with both the unauthorized communication in units of the pairs of the transmission source and the destination and the unauthorized communication in units of the IP flows, and is applicable to a system that copes with only one of these unauthorized communications.

What is claimed is:

1. An unauthorized communication coping system that performs unauthorized communication coping which is coping with unauthorized communication detected by an unauthorized communication detection device that performs unauthorized communication determination which is determination of whether or not communication is unauthorized communication based on a packet, the system comprising:
 a routing device that performs routing of a packet in conformance with a wireless communication protocol in a wireless communication section which is a communication section that connects a base station and a core network device, the routing device performing network tapping on a packet as a routing target and transmitting the network-tapped packet to the unauthorized communication detection device; and
 an unauthorized communication coping device that performs, for unauthorized communication which is communication for which a result of the unauthorized communication determination based on the network-tapped packet is true, unauthorized communication coping including configuring communication control information which is information for controlling the unauthorized communication for at least one of the routing device and the core network device; wherein
 the core network device is connected to the wireless communication section and an IP communication section,
 the IP communication section is a communication section in which communication according to an IP is performed,
 the unauthorized communication detection device is a device that specifies an IP address of each of a transmission source and a destination based on the network-tapped packet,
 the unauthorized communication coping device specifies a device ID corresponding to an IP address for at least one of a transmission source and a destination of the detected unauthorized communication based on IP-SIM information which is information indicating a correspondence relationship between the IP address and the device ID, and the unauthorized communication coping includes configuring communication control information which is information for controlling communication of a device identified from the specified device ID for at least one of the routing device and the core network device.

2. The unauthorized communication coping system according to claim 1, wherein
the network-tapped packet is an IP packet having an IP header including information indicating an IP address of each of a transmission source and a destination.

3. The unauthorized communication coping system according to claim 2, wherein the network-tapped packet is an IP packet having an IP header including information satisfying a predetermined condition, among IP packets included in the packet as the routing target.

4. The unauthorized communication coping system according to claim 1, wherein
the core network device is a device that controls communication in units of device IDs based on the communication control information, and
the unauthorized communication coping device configures the communication control information of the device ID corresponding to an IP address for the core network device for at least one of the transmission source and the destination of the detected unauthorized communication.

5. The unauthorized communication coping system according to claim 1, wherein
the routing device is a device that specifies an IP flow and performs a routing action according to communication control information of the specified IP flow,
the IP flow is communication conforming to a transmission source IP address, a transmission source port number, a destination IP address, a destination port number, and a protocol used in the IP communication section, and
the unauthorized communication coping device configures the communication control information of the IP flow for the routing device for at least one of the transmission source and the destination of the detected unauthorized communication.

6. The unauthorized communication coping system according to claim 1, wherein
the unauthorized communication coping device
determines a coping content for at least one of a transmission source and a destination of the detected unauthorized communication based on coping management information which is information indicating a coping content indicating unauthorized communication coping to be performed in units of communication which is one or both of the transmission source and the destination, and
performs unauthorized communication coping according to the determined coping content.

7. The unauthorized communication coping system according to claim 6, wherein
the routing device is a device that specifies an IP flow and performs a routing action according to communication control information of the specified IP flow,
the core network device is a device that controls communication in units of device IDs based on the configured communication control information, and
the unauthorized communication coping device
configures communication control information for a device ID corresponding to an IP address for the core network device for at least one of a transmission source and a destination of the unauthorized communication when the determined coping content includes communication control in units of device IDs, and
configures communication control information for the IP flow for the routing device for at least one of the transmission source and the destination of the unauthorized communication when the determined coping content is communication control in units of IP flows.

8. The unauthorized communication coping system according to claim 6, wherein
the unauthorized communication coping is at least one of the following (a) to (f),
(a) configuring communication control information which means disabling or bandwidth limitation of the device ID corresponding to the IP address for the core network device for at least one of the transmission source and the destination of the detected unauthorized communication,
(b) performing notification indicating that (a) is performed,
(c) making an inquiry about whether or not to approve the performing of (a), and performing (a) when the approval is accepted in response to the inquiry,
(d) configuring communication control information which means blocking or bandwidth limitation of an IP flow for the routing device for at least one of the transmission source and the destination of the detected unauthorized communication,
(e) performing notification indicating that (d) is performed, and
(f) making an inquiry about whether or not to approve the performing of (d), and performing (d) when the approval is accepted in response to the inquiry.

9. An unauthorized communication coping method for performing unauthorized communication coping which is coping with unauthorized communication detected by an unauthorized communication detection device that performs unauthorized communication determination which is determination of whether or not communication is unauthorized communication based on a packet, the method comprising:
receiving, when a result of the unauthorized communication determination based on a packet network-tapped by a routing device that performs communication conforming to a wireless communication protocol and performs routing of a packet in conformance with a wireless communication protocol is true in a wireless communication section which is a communication section that connects a base station and a core network device, alert information which is information about the unauthorized communication for which the result of the unauthorized communication determination is true;
performing, for unauthorized communication indicated by the alert information, unauthorized communication coping including configuring communication control information which is information for controlling the unauthorized communication for at least one of the routing device and the core network device;
wherein the core network device is connected to the wireless communication section and an IP communication section,
the IP communication section is a communication section in which communication according to an IP is performed,
the unauthorized communication detection device is a device that specifies an IP address of each of a transmission source and a destination based on the network-tapped packet; and specifying a device ID corresponding to an IP address for at least one of a transmission source and a destination of the detected unauthorized communication based on IP-SIM information which is information indicating a correspondence relationship between the IP address and the device ID;

wherein the unauthorized communication coping includes configuring communication control information which is information for controlling communication of a device identified from the specified device ID for at least one of the routing device and the core network device.

10. An unauthorized communication coping device that performs unauthorized communication coping which is coping with unauthorized communication detected by an unauthorized communication detection device that performs unauthorized communication determination which is determination of whether or not communication is unauthorized communication based on a packet, the device comprising:

an interface device that receives, when a result of the unauthorized communication determination based on a packet network-tapped by a routing device that performs routing a packet in conformance with a wireless communication protocol is true in a wireless communication section which is a communication section that connects a base station and a core network device, alert information which is information about the unauthorized communication for which the result of the unauthorized communication determination is true; and a coping control device that performs, for unauthorized communication indicated by the alert information, unauthorized communication coping including configuring communication control information which is information for controlling the unauthorized communication for at least one of the routing device and the core network device; wherein the core network device is connected to the wireless communication section and an IP communication section, the IP communication section is a communication section in which communication according to an IP is performed, the unauthorized communication detection device is a device that specifies an IP address of each of a transmission source and a destination based on the network-tapped packet, the unauthorized communication coping device specifies a device ID corresponding to an IP address for at least one of a transmission source and a destination of the detected unauthorized communication based on IP-SIM information which is information indicating a correspondence relationship between the IP address and the device ID, and the unauthorized communication coping includes configuring communication control information which is information for controlling communication of a device identified from the specified device ID for at least one of the routing device and the core network device.

* * * * *